(12) United States Patent
Diaz et al.

(10) Patent No.: US 9,334,974 B2
(45) Date of Patent: May 10, 2016

(54) PILOT OPERATED RELIEF VALVE WITH DUAL PILOT REGULATORS

(71) Applicant: EMERSON PROCESS MANAGEMENT REGULATOR TECHNOLOGIES, INC., McKinney, TX (US)

(72) Inventors: Juan M. Diaz, Plano, TX (US); Khashayar A. Nashery, Dallas, TX (US); Bryan J. Steger, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 117 days.

(21) Appl. No.: 14/039,549

(22) Filed: Sep. 27, 2013

(65) Prior Publication Data

US 2014/0090725 A1   Apr. 3, 2014

Related U.S. Application Data

(60) Provisional application No. 61/707,257, filed on Sep. 28, 2012.

(51) Int. Cl.
*F16K 31/14* (2006.01)
*F16K 17/00* (2006.01)
*F16K 17/10* (2006.01)

(52) U.S. Cl.
CPC ............... *F16K 17/00* (2013.01); *F16K 17/10* (2013.01); *Y10T 137/7768* (2015.04)

(58) Field of Classification Search
CPC ... F16K 17/00; F16K 17/10; Y10T 137/7768; Y10T 137/7769; Y10T 137/87; Y10T 137/8225; Y10T 137/8309; Y10T 137/8275; Y10T 137/87113

USPC ......... 137/489.5, 492, 630.17, 637.1, 614.11, 137/553, 566.6, 556

See application file for complete search history.

(56) References Cited

U.S. PATENT DOCUMENTS

| 599,283 | A | * | 2/1898 | Freitas | ............................. 126/42 |
| 746,896 | A | * | 12/1903 | Stott | ........................... 137/637.1 |

(Continued)

FOREIGN PATENT DOCUMENTS

| DE | 970815 C | 10/1958 |
| DE | 3401369 A1 | 8/1984 |

(Continued)

OTHER PUBLICATIONS

Search Report for PCT/US2013/062094, mailed Dec. 5, 2013.

(Continued)

*Primary Examiner* — Craig Schneider
*Assistant Examiner* — Minh Le
(74) *Attorney, Agent, or Firm* — Marshall, Gerstein & Borun LLP

(57) ABSTRACT

A pilot operated pressure relief valve includes a valve body having a fluid inlet and a fluid outlet connected by a fluid passageway. A valve plug may be disposed within the fluid passageway, the valve plug cooperating with a valve seat to control fluid flow through the fluid passageway. An actuator may be connected to the valve plug, the regulator biasing the valve plug towards the valve seat. A pilot assembly may include a first pilot valve and a second pilot valve, wherein the pilot assembly directs fluid pressure upstream of the valve plug to one of the first and second pilot valves. When the upstream fluid pressure exceeds a predetermined level, the valve plug moves away from the valve seat allowing fluid to flow through the fluid passageway.

19 Claims, 5 Drawing Sheets

(56) References Cited

U.S. PATENT DOCUMENTS

| | | | | |
|---|---|---|---|---|
| 1,156,977 A | * | 10/1915 | Cloos | 137/630.17 |
| 1,182,287 A | * | 5/1916 | McNeil | 137/630.17 |
| 1,203,798 A | * | 11/1916 | Sieber | 137/630.17 |
| 2,463,737 A | * | 3/1949 | Berck | 137/637.1 |
| 2,720,214 A | * | 10/1955 | Rupp et al. | 137/315.04 |
| 3,380,479 A | * | 4/1968 | Bassan et al. | 137/627.5 |
| 3,568,706 A | * | 3/1971 | Weise | 137/112 |
| 3,792,612 A | * | 2/1974 | Lammel et al. | 73/864.34 |
| 4,429,711 A | * | 2/1984 | Schomer | 137/385 |
| 4,593,717 A | * | 6/1986 | Levasseur | 137/556.6 |
| 4,611,626 A | * | 9/1986 | Logsdon | 137/594 |
| 4,672,995 A | * | 6/1987 | Powell | 137/489 |
| 4,865,074 A | * | 9/1989 | Bickford et al. | 137/489 |
| 4,870,989 A | * | 10/1989 | Bickford et al. | 137/489 |
| 5,590,684 A | * | 1/1997 | Alberts et al. | 137/489 |
| 5,842,501 A | * | 12/1998 | Powell et al. | 137/489 |
| 5,890,508 A | * | 4/1999 | Powell | 137/15.19 |
| 5,992,449 A | * | 11/1999 | Sprague | 137/488 |
| 6,161,571 A | * | 12/2000 | Taylor | 137/492 |
| 6,415,815 B1 | | 7/2002 | Blann et al. | |
| 6,415,819 B1 | * | 7/2002 | Pas et al. | 137/597 |
| 6,644,346 B1 | * | 11/2003 | Conrads et al. | 137/491 |
| 8,136,545 B2 | * | 3/2012 | Jablonski | 137/492 |

FOREIGN PATENT DOCUMENTS

| | | |
|---|---|---|
| DE | 19532928 A1 | 3/1997 |
| DE | 102008011982 A2 | 9/2009 |

OTHER PUBLICATIONS

Written Opinion for PCT/US2013/062094, mailed Dec. 5, 2013.

* cited by examiner

PILOT OPERATED RELIEF VALVE WITH DUAL PILOT REGULATORS

FIELD OF THE DISCLOSURE

The disclosure generally relates to relief valves and more specifically to pilot operated relief valves.

BACKGROUND OF THE DISCLOSURE

Pressure relief valves are used in a variety of commercial, industrial and domestic applications to maintain a pressure within a container below a predetermined maximum pressure. Specifically, if the pressure within the container exceeds a start-to-discharge pressure or predetermined maximum pressure, the pressure relief valve will vent a fluid or vapor to the atmosphere until the pressure within the container decreases below the predetermined maximum pressure. The amount and rate at which the fluid or vapor is vented to the atmosphere is associated with the magnitude of the pressure within the container.

Different pressure relief valves have different sizes, start-to-discharge pressures and flow capacities. A pressure relief valve may be selected for use with a container based on a design specification of the container such as a maximum pressure to which the container can be safely exposed without rupturing.

Known pressure relief valves often include an actuator having a spring that exerts a force on a shaft to urge a valve seat towards a seating surface. In practice, if a plurality of pressure relief valves is used with a manifold assembly, each of the plurality of pressure relief valves is at least partially positioned within one of a plurality of tubes coupled to the manifold assembly. Typically, each tube is substantially the same length as the pressure relief valve and is made of a metal material and, thus, the length and weight of the pressure relief valve drastically impacts the overall weight and size (e.g., height) of the manifold assembly.

Multiple pressure relief valve manifolds are used particularly in propane, natural gas, and anhydrous ammonia storage tanks. These manifolds typically include four pressure relief valves that are fluidly connected to the manifold. A selection mechanism selectively disconnects one of the pressure relief valves from the manifold at a time for testing, periodic maintenance, and/or replacement. Multiple pressure relief valve manifolds are typically large, heavy, and prone to leakage at the connection between the pressure relief valves and the manifold.

SUMMARY

In accordance with one exemplary aspect of the present invention, a pilot operated relief valve includes a valve body having a fluid inlet and a fluid outlet connected by a fluid passageway. A valve plug may be disposed within the fluid passageway, the valve plug cooperating with a valve seat to control fluid flow through the fluid passageway. An actuator may be connected to the valve plug, the actuator biasing the valve plug towards the valve seat. A pilot assembly may include a first pilot valve and a second pilot valve, wherein the pilot assembly directs fluid pressure upstream of the valve plug to a rotary valve, which directs the upstream pressure to one of the first and second pilot valves. When the upstream fluid pressure exceeds a predetermined level, the first or second pilot valve activates to relieve a loading pressure acting on a diaphragm in the actuator, which allows upstream pressure to move the valve plug away from the valve seat thereby allowing fluid to flow through the fluid passageway.

In another exemplary aspect of the present invention, a pilot assembly for a pilot actuated pressure relief valve includes a first pilot valve, a second pilot valve, a first rotary valve fluidly connected to the first pilot valve and to the second pilot valve, and a second rotary valve fluidly connected to the first pilot valve and to the second pilot valve.

In further accordance with any one or more of the foregoing aspects, a pilot operated relief valve (or a pilot assembly for a pilot operated relief valve) may further include any one or more of the following preferred forms.

In some preferred forms, the pilot operated relief valve may include a first rotary valve and a second rotary valve, the first and second rotary valves being fluidly connected to one another and to the first and second pilot valves, wherein the first rotary valve and the second rotary valve are mechanically connected to one another so that the first rotary valve and the second rotary valve are actuated simultaneously by an actuating means. In some preferred forms, the actuating means may be a lever. In other preferred forms, the lever may have a handle portion and a connection portion. In yet other preferred forms, the connection portion may be operatively connected to a valve stem of the first rotary valve and to a valve stem of the second rotary valve. In yet other preferred forms, the lever may include indicia disposed on a first side of the handle portion, the indicia indicating whether the first pilot valve or the second pilot valve is active. In yet other preferred forms, the lever may include indicia disposed a second side of the handle portion. In yet other preferred forms, at least one of the first rotary valve and the second rotary valve may be an L-type three way rotary valve. In yet other preferred forms, the first rotary valve may include one inlet and two outlets. In yet other preferred forms, the second rotary valve may include two inlets and one outlet. In some preferred forms, the outlet of the second rotary valve may be fluidly connected to an inlet port on an actuator.

Figure 1:
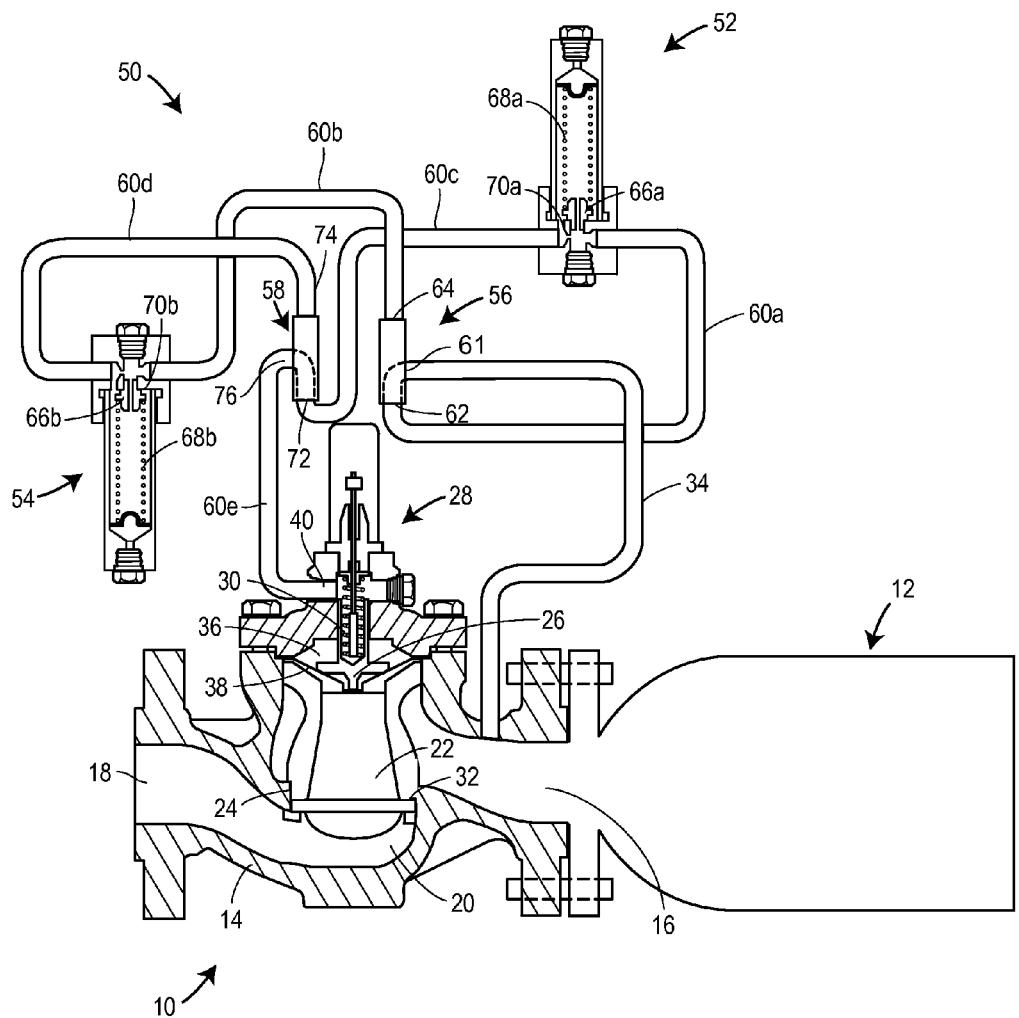
FIG. 1 is a schematic diagram of a pilot operated relief valve having two pilot regulators.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION

Referring now to the drawings and with specific reference to FIG. 1, a pilot operated relief valve 10 is fluidly connected to a fluid container 12. The pilot operated relief valve 10 includes a valve body 14 having a fluid inlet 16 and a fluid outlet 18 connected by a fluid passageway 20. A valve plug 22 and a valve seat 24 are disposed within the valve body 14. The valve plug 22 and the valve seat 24 cooperate to control fluid flow through the fluid passageway 20.

The valve plug 22 may be operatively connected to a stem 26 that is connected to a loading chamber 36 of an actuator 28. The actuator 28 may include biasing device, such as a spring 30, which biases the stem 26 and the valve plug 22 in a direction that moves a seating surface 32 of the valve plug 22 towards the valve seat 24 so that fluid flow through the fluid passageway 20 is normally prevented. When fluid pressure within the container 12 and thus within the inlet 16, exceeds a predetermined level, a loading fluid pressure in the loading chamber 36 is relieved by one of the pilot valves 52, 54, and the biasing force produced by the spring 30 is overcome by fluid pressure within the fluid passageway 20 and the seating surface 32 moves away from the valve seat 24 to allow fluid to flow through the fluid passageway 20 to the fluid outlet 18. As fluid within the container 12 is vented through the outlet 18, pressure within the container 12 and thus within the inlet 16 decreases. When the pressure within the inlet 16 decreases sufficiently, the pilot valve 52, 54 will close and loading pressure will be restored to the loading chamber 36. The loading pressure in the loading chamber 36 cancels forces generated by fluid pressure in the fluid passageway 20 and thus, the biasing force produced by the spring 30 will cause the seating surface 32 to move back into contact with the valve seat 24, thereby stopping fluid flow through the fluid passageway 20.

Upstream or supply fluid pressure may be tapped from an upstream inlet line 34 and ultimately fed into a first rotary valve 56, which directs the upstream fluid pressure to either the first pilot valve 52 or the second pilot valve 54. The spring 30 may be located in the loading chamber 36 in some embodiments. A loading pressure inlet port 40 in the actuator 28 may be fluidly connected to the chamber 36 and to one of the first and second pilot valves 52, 54 by a pilot assembly 50 for venting fluid from the loading chamber 36 during overpressure conditions.

The pilot assembly 50 may include the first and second pilot valves 52, 54, the first rotary valve 56, a second rotary valve 58, and a plurality of fluid lines 60a, 60b, 60c, 60d, 60e that fluidly connect the first and second pilot valves 52, 54 to the first and second rotary valves 56, 58 and/or to the loading chamber 36. By manipulating the first and second rotary valves 56, 58, an operator may select either the first pilot valve 52 or the second pilot valve 54 to be an active pilot valve. The active pilot valve vents the loading pressure from the loading chamber 36 when upstream fluid pressure in the upstream inlet line 34 exceeds a predetermined level, which is set in the pilot valves 52, 54. When selecting an active pilot valve, the operator designates the other pilot valve as a stand-by or non-active pilot. The stand-by or non-active pilot may be removed and replaced, or maintained as necessary without disrupting the pilot operated relief valve 10. In some embodiments, both the first pilot valve 52 and the second pilot valve 54 may be active at the same time.

The pilot assembly 50 delivers upstream or supply fluid pressure (e.g., container 12 fluid pressure) to one of the two pilot valves 52, 54, which to assist in opening the pilot operated relief valve 10 when upstream pressure exceeds a predetermined level by venting loading pressure from the loading chamber 36. Upstream pressure is first communicated to a supply pressure inlet 61 of the first rotary valve 56 by the upstream inlet line 34. The first rotary valve 56 directs upstream or supply pressure to one of the first and second pilot valves 52, 54 (or in other embodiments to both the first and second pilot valves 52, 54). The first rotary valve 56 directs the supply pressure to either the first pilot valve 52 through a first supply outlet 62 and a first fluid line 60a or to the second pilot valve 54 through a second supply outlet 64 and a second fluid line 60b.

The first and second pilot valves 52, 54 may be set to allow loading pressure to vent to the atmosphere when supply pressure exceeds a predetermined level or set point. The first and second pilot valves 52, 54, may include a valve plug 66a, 66b that is biased closed by a biasing element or spring 68a, 68b. When fluid pressure in the first or second fluid lines 60a, 60b produces an opening force on the valve plugs 66a, 66b sufficient to overcome the biasing force produced by the spring 68a, 68b, the valve plug 66a, 66b moves away from a valve seat 70a, 70b to allow loading pressure to vent through the pilot valve 52, 54. Once the pilot valve 52, 54, opens, fluid pressure is vented from a first loading pressure outlet 72 of the second rotary valve 58 through the first pilot valve 52 or from a second loading pressure outlet 74 of the second rotary valve 58 through the second pilot valve 54. The second rotary valve 58 may be positioned to direct loading pressure from loading pressure inlet 76 through one of the first loading pressure outlet 72 and the second loading pressure outlet 74 to either the first or second pilot valve 52, 54.

The pilot assembly 50 of FIG. 1 illustrates a first condition that directs supply pressure to the first pilot valve 52 so that the first pilot valve 52 determines when fluid pressure is ultimately vented from the inlet port 40 and thus from the loading chamber 36 to open the pilot operated relief valve 10. Fluid flows from the container 12, through the upstream inlet line 34 to the first rotary valve 56. The first rotary valve 56 in the embodiment illustrated in FIG. 1 is a three way, L-shaped rotary valve. When positioned as illustrated in FIG. 1, the first rotary valve 56 directs fluid from the upstream inlet line 34 to the first pilot valve 52 through the first fluid line 60a. When the fluid pressure is sufficient to open the first pilot valve 52, fluid is vented from the loading chamber 36 through the third fluid line 60c. In this configuration, the second rotary valve 58 directs fluid from the fifth fluid line 60e to the third fluid line 60c and ultimately to the first pilot valve 52.

In a second condition (not illustrated), the pilot valve assembly 50 may be arranged to direct supply fluid pressure to the second pilot valve 54 so that the second pilot valve 54 determines when fluid pressure is ultimately vented from the loading chamber 56 to open the pilot operated relief valve 10. Fluid flows from the container 12, through the upstream inlet line 34 to the first rotary valve 56. When positioned to direct fluid flow to the second pilot valve 54, the first rotary valve 56 directs fluid from the upstream inlet line 34 to the second pilot valve 54 through the second supply fluid line 60b. When the fluid pressure is sufficient to open the second pilot valve 54, fluid vents from the loading chamber 36 through the second rotary valve 58 and through the fourth fluid line 60d. The second rotary valve 58 directs fluid from the fifth fluid line 60e to the fourth fluid line 60d, which is attached to second pilot valve 54.

In other embodiments, the rotary valves may be T-shaped rotary valves that include a position which allows fluid to flow to both the first pilot valve 52 and the second pilot valve 54 at the same time, thereby preventing fluid isolation of either pilot valve if the rotary valves are placed in an intermediate position. In yet other embodiments, the first and second rotary valves 56, 58 may be replaced with a single two position, six-way block or valve that combines the functions of the first and second rotary valves 56, 58 into a single unit.

Figure 2:
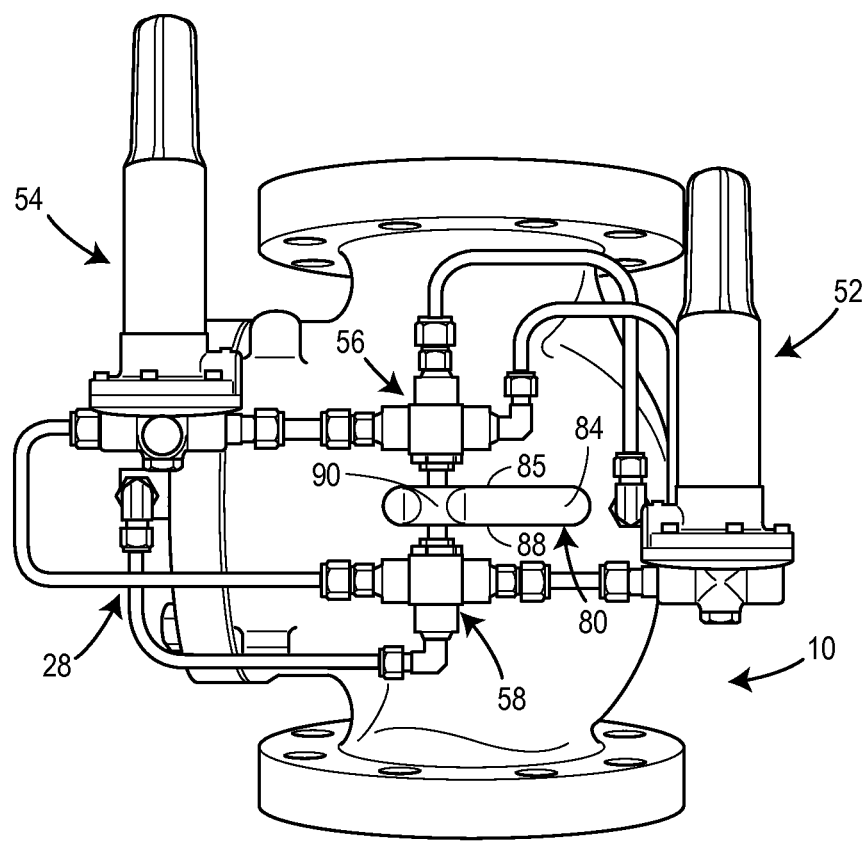
FIG. 2 is a perspective view of the pilot operated relief valve of FIG. 1, with a first pilot regulator selected as the active pilot regulator.
Figure 3:
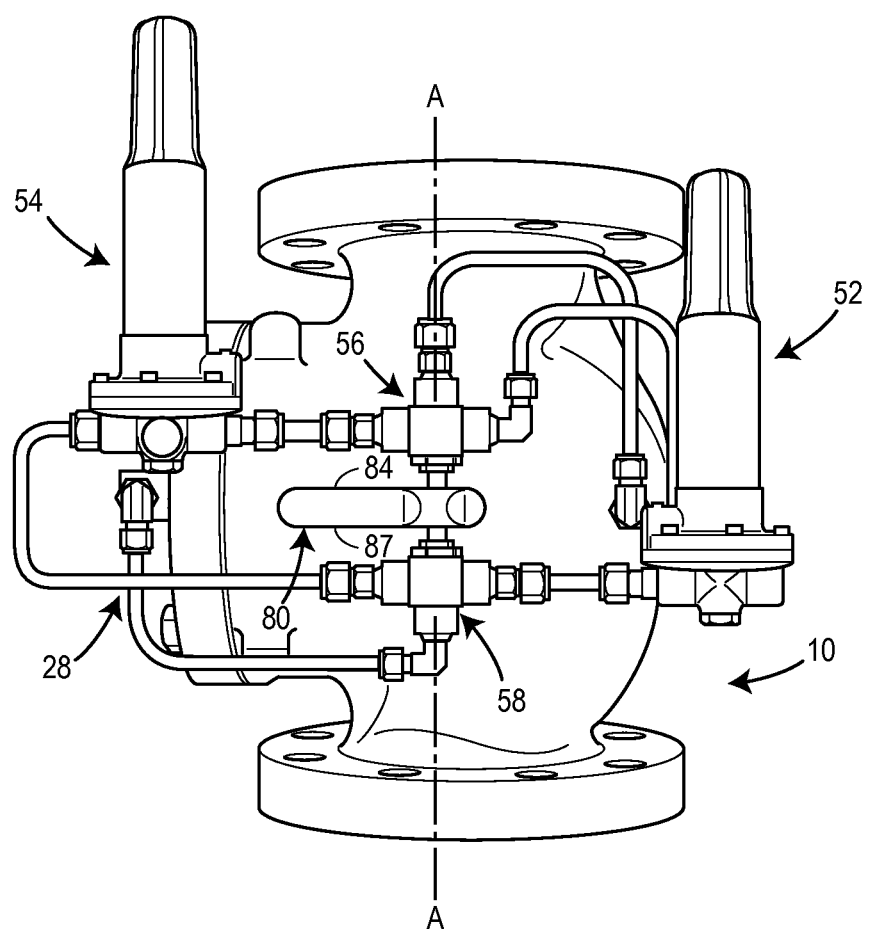
FIG. 3 is a perspective view of the pilot operated relief valve of FIG. 1 with a second pilot regulator selected as the active pilot regulator.
Figure 4:
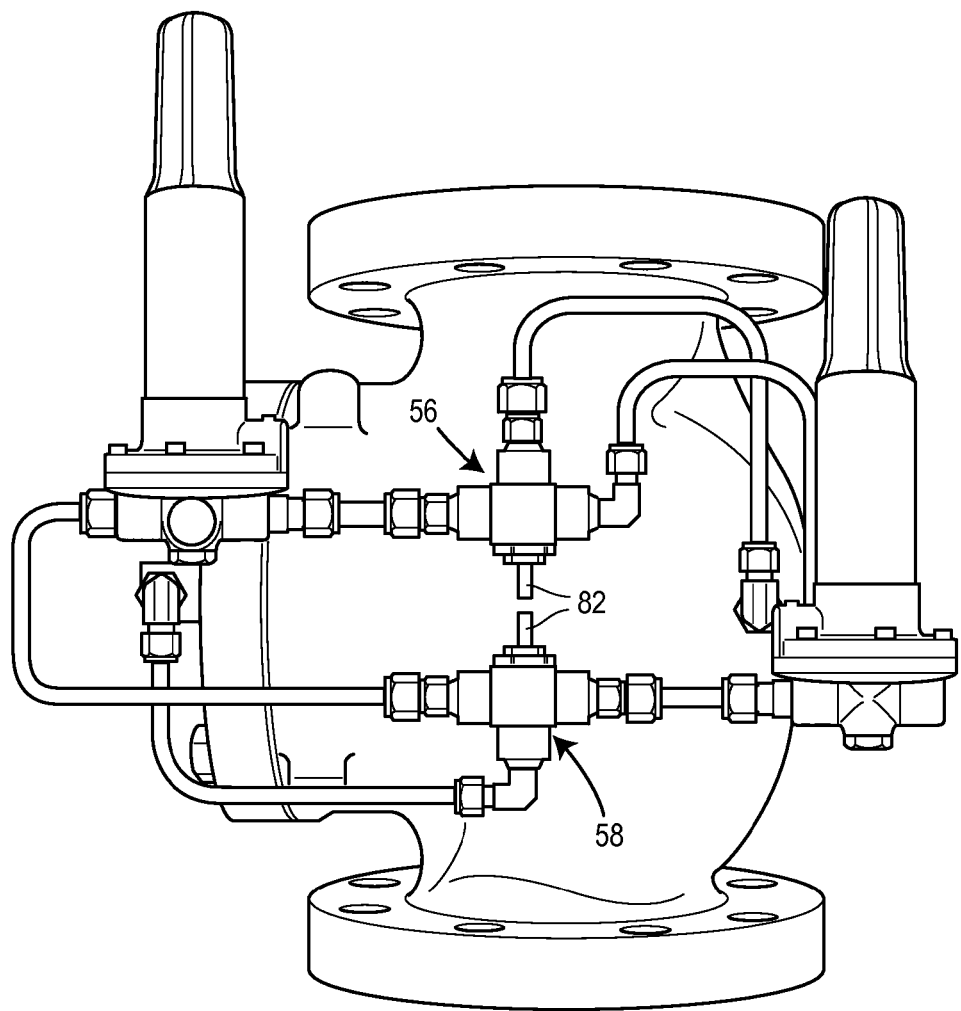
FIG. 4 is a close-up perspective view of the pilot operated relief valve of FIG. 2 with a selector lever removed, exposing shafts of a first and second rotary selector valve.

Turning now to FIGS. 2 and 3, in one exemplary embodiment, the first and second rotary valves 56, 58 may be mechanically connected by a handle, a lever 80, or similar performing feature. The lever 80 may be attached to valve stems 82 (see FIG. 4) of each of the first and second rotary valves 56, 58 so that the first and second rotary valves 56, 58 are actuated in unison. FIG. 2 illustrates a first configuration (corresponding to the configuration illustrated in FIG. 1) where upstream or supply fluid pressure is directed to the first pilot valve 52. The lever 80 may include indicia 84 on a first side 85 that indicates the active pilot valve in some manner (e.g., with words and/or symbols). For example, the lever 80 illustrated in FIG. 2 has indicia stating "active pilot" and an arrow pointing to the active pilot valve, which is the first pilot valve 52 in the embodiment illustrated in FIG. 2. In this manner, an operator can quickly identify the active pilot valve.

FIG. 3 illustrates a second configuration where upstream fluid pressure is directed to the second pilot valve 54. The lever 80 includes indicia 84 on a second side 87 that indicates that the second pilot valve 54 is the active pilot valve. In this manner, the indicia 84 contribute to the functionality of the pilot assembly 50 by identifying the active pilot to an operator. Thus, the operator can be confident that the first and second rotary valves 56, 58 are positioned correctly before performing maintenance on one of the pilot valves 52, 54.

In the embodiment of FIGS. 2 and 3, the lever 80 includes a flat handle portion 88 and a connection portion 90. The flat handle portion 88 may include the indicia 84 on the first and second sides 85, 87, or on only one side. The connection portion 90 may be attached to the valve stems 84 of the first and second rotary valves 56, 58. Thus, actuation of the lever 80 produces coordinated and simultaneous movement of the valve stems 82, which results in coordinated movement of the internal components of the first and second rotary valves 56, 58 to properly direct upstream or supply fluid pressure to the desired pilot valve. In the embodiment of FIGS. 2 and 3, the flat handle portion 88 extends laterally (or has a width) in a direction substantially parallel (or parallel) to an axis of rotation A of the valve stems 82.

Figure 5:
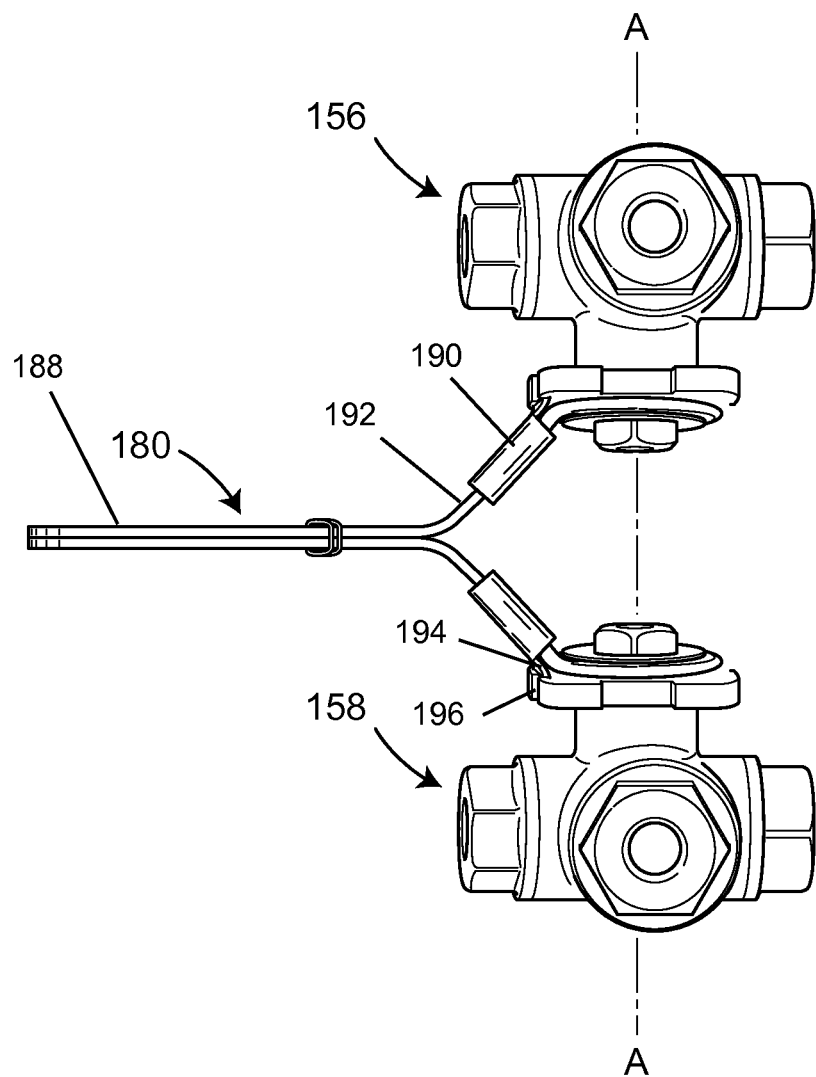
FIG. 5 is a front plan view of an alternate selector lever connected to shafts of two rotary selector valves.

Turning now to FIG. 5, an alternate exemplary embodiment of the lever 180 is illustrated. In the embodiment of FIG. 5, the lever 180 includes a flat handle portion 188 that extends laterally (or has a width) in a direction that is substantially perpendicular (or perpendicular) to the axis of rotation A of the valve stems of the first and second rotary valves 156, 158. The pilot assembly 50 may be arranged so that the handle portion 188 points to the active pilot valve for easy identification. The lever 180 may be formed by two separate levers (one attached to each rotary valve) having the flat handle portions 188 secured to one another. The handle portions 188 may be secured by virtually any means, such as fasteners, adhesive, hook and loop fasteners, welds, clamps, rivets, straps, pins, or any other means of securing one handle to another handle. Alternatively, the handle portions may be secured to one another by a handle extension, such as a metal or plastic sheath that slides over both handle portions. Furthermore, the handle portions could be secured or locked in a desired position with safety wire. The safety wire could be secured to the active pilot in some embodiments and the safety wire could also serve as a tampering indicator. For example, if the safety wire were broken a warranty may be voided.

In the embodiment illustrated in FIG. 5, the handle 180 includes a pair of slider locks 190 on legs 192 of each handle 188. The slider locks 190 may include a tab 194 that engages a recess 196 on the rotary valve 156, 158. When the handle 188 needs to be moved, the slider locks 190 are moved along the leg 192 until the tab 194 disengages from the recess 96. After the handle 188 is in its new position, the slider locks 190 may be moved towards the recess 196 until the tab 194 engages the recess 196, thereby preventing further rotation of the handle 188 and locking the handle 188 in position. In other embodiments, the legs 192 may include openings through which a pin or lug may be placed to prevent the slider locks 190 from inadvertently becoming disengaged.

In yet other embodiments, the handle 188 could be provided with a toggle mechanism to prevent the handle from being left in an intermediate position.

In yet other embodiments, a single U-shaped handle may be connected to both rotary valves.

In yet other embodiments, the actuator may be provided with an indicator, such as a spring position indicator that indicates when loading pressure has been released from the loading pressure chamber. Indicator position may be tracked and monitored so that maintenance and/or replacement of parts may be scheduled if the indicator history determines that parts are failing.

Although the pilot assemblies have been described herein with respect to propane, natural gas, and anhydrous ammonia industries, the disclosed pilot assemblies may be used in valves that control other types of fluid flows.

Any of the embodiments of the disclosed pilot operated relief valve described herein advantageously are adaptable to a wide range of containers. The disclosed pilot operated relief valves also advantageously have less moving parts when compared to prior art pressure relief valve manifold systems, which typically include four or more valves. Additionally, maintenance, repair, and replacement of the disclosed pilot operated relief valves are simplified due to the ability to select one pilot while the non-selected pilot is repaired or replaced. Moreover, the disclosed pilot operated relief valves may be connected to gas containers via a flange rather than with a NPT connection, as is the case with pressure relief valve manifold systems. As a result, leaks which typically occur in NPT connections are eliminated. The pilot valves of the disclosed pilot operated relief valves may be easily and quickly disconnected from the system via compression fittings, which makes maintenance and repair/replacement more convenient. Finally, the disclosed pilot operated relief valves are smaller and lighter than conventional pressure relief valve manifold systems.

The disclosed selector handle and rotary selector valves of the disclosed pilot operated valve advantageously allows a user to quickly and accurately identify the active pilot valve. Further, the disclosed selector handle and rotary selector valves prevent inadvertent rotary selector combinations from being selected as the rotary selector valves are physically joined by the selector handle.

Although certain pilot operated relief valves have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

What is claimed is:

1. A pilot operated relief valve, comprising:
   a valve body having a fluid inlet and a fluid outlet connected by a fluid passageway;
   a valve plug disposed within the fluid passageway, the valve plug cooperating with a valve seat to control fluid flow through the fluid passageway;
   an actuator connected to the valve plug, the actuator biasing the valve plug towards the valve seat; and
   a manifoldless pilot assembly including a first pilot valve and a second pilot valve, the pilot assembly directing fluid pressure upstream of the valve plug to one of the first and second pilot valves,
   wherein the valve plug moves away from the valve seat allowing fluid to flow through the fluid passageway when the upstream fluid pressure exceeds a predetermined level,
   wherein the pilot assembly further comprises a first rotary valve and a second rotary valve, the first and second rotary valves being fluidly connected to one another and to the first and second pilot valves, and
   wherein the first rotary valve and the second rotary valve are mechanically connected to one another so that the first rotary valve and the second rotary valve are actuated simultaneously by an actuating means.

2. The pilot operated pressure relief valve of claim 1, wherein the actuating means is a lever.

3. The pilot operated pressure relief valve of claim 2, wherein the lever has a handle portion and a connection portion.

4. The pilot operated pressure relief valve of claim 3, wherein the connection portion is operatively connected to a valve stem of the first rotary valve and to a valve stem of the second rotary valve.

5. The pilot operated pressure relief valve of claim 3, wherein the lever includes indicia disposed on a first side of the handle portion, the indicia indicating an active pilot valve.

6. The pilot operated pressure relief valve of claim 5, wherein the lever includes indicia disposed a second side of the handle portion.

7. The pilot operated pressure relief valve of claim 6, wherein at least one of the first rotary valve and the second rotary valve is an L-type three way rotary valve.

8. The pilot operated pressure relief valve of claim 1, wherein the first rotary valve includes one inlet and two outlets.

9. The pilot operated pressure relief valve of claim 8, wherein the second rotary valve includes one inlet and two outlets.

10. The pilot operated pressure relief valve of claim 9, wherein the inlet of the second rotary valve is fluidly connected to an inlet port on the actuator.

11. The pilot operated relief valve of claim 1, wherein the actuator includes a loading chamber having a loading fluid pressure that acts on the valve plug to bias the valve plug towards the valve seat.

12. A manifoldless pilot assembly for a pilot operated pressure relief valve, the pilot assembly comprising:
    a first pilot valve;
    a second pilot valve;
    a first rotary valve fluidly connected to the first pilot valve and to the second pilot valve without a manifold; and
    a second rotary valve fluidly connected to the first pilot valve and to the second pilot valve without a manifold,
    wherein the first rotary valve and the second rotary valve are mechanically connected to one another so that the first rotary valve and the second rotary valve are actuated simultaneously by an actuating means.

13. The pilot assembly of claim 12, wherein the actuating means is a lever.

14. The pilot assembly of claim 13, wherein the lever has a handle portion and a connection portion.

15. The pilot assembly of claim 14, wherein the connection portion is operatively connected to a valve stem of the first rotary valve and to a valve stem of the second rotary valve.

16. The pilot assembly of claim 14, wherein the lever includes indicia disposed on a first side of the handle portion, the indicia indicating an active pilot valve.

17. The pilot assembly of claim 16, wherein the lever includes indicia disposed a second side of the handle portion.

18. The pilot assembly of claim 12, wherein one of the first rotary valve and the second rotary valve is an L-type three way rotary valve.

19. The pilot assembly of claim 12, wherein the first pilot valve has a first pressure set point and the second pilot valve has a second pressure set point.

* * * * *